(12) United States Patent
Henry et al.

(10) Patent No.: US 12,012,022 B2
(45) Date of Patent: Jun. 18, 2024

(54) WEFT KNIT INTERDIGITATED ELECTRODES FOR AUTOMOTIVE INTERIOR HEATING ELEMENTS

(71) Applicant: GM GLOBAL TECHNOLOGY OPERATIONS LLC, Detroit, MI (US)

(72) Inventors: Christopher P. Henry, Thousand Oaks, CA (US); Nancy L. Johnson, Northville, MI (US); Paul W. Alexander, Ypsilanti, MI (US); Dorel M. Sala, Troy, MI (US); Anthony L Smith, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 934 days.

(21) Appl. No.: 17/034,642

(22) Filed: Sep. 28, 2020

(65) Prior Publication Data

US 2022/0097581 A1    Mar. 31, 2022

(51) Int. Cl.
| | |
|---|---|
| *B60N 2/56* | (2006.01) |
| *D04B 1/16* | (2006.01) |
| *D04B 1/22* | (2006.01) |
| *H01B 5/12* | (2006.01) |
| *H05B 3/12* | (2006.01) |
| *H05B 3/34* | (2006.01) |

(52) U.S. Cl.
CPC ............ *B60N 2/5685* (2013.01); *D04B 1/16* (2013.01); *D04B 1/22* (2013.01); *H01B 5/12* (2013.01); *H05B 3/12* (2013.01); *H05B 3/347* (2013.01); *D10B 2401/16* (2013.01); *H05B 2203/006* (2013.01); *H05B 2203/011* (2013.01)

(58) Field of Classification Search
CPC .......... B60N 2/5685; D04B 1/16; D04B 1/22; D04B 1/12; H01B 5/12; H05B 3/12; H05B 3/347; H05B 3/345; H05B 2203/006; H05B 2203/011; D10B 2401/16; D10B 2505/08
See application file for complete search history.

(56) References Cited

U.S. PATENT DOCUMENTS 5,484,983 A * 1/1996 Roell ................ D04B 1/12
219/545
6,373,034 B1   4/2002 Rock et al.
(Continued)

FOREIGN PATENT DOCUMENTS

CN         210183572 U      3/2020

*Primary Examiner* — Shawntina T Fuqua
(74) *Attorney, Agent, or Firm* — Lorenz & Kopf LLP

(57) ABSTRACT

In an exemplary embodiment, an interior heating system for occupant seats of a vehicle is provided. The interior heating system uses a weft co-knit fabric combined with at least one conductive electrode to heat selective regions of a vehicle seat. The interior heating system includes the weft co-knit fabric that contains a set of weft knit active or plated emitting yarn configured with at least one conductive electrode. The knit active or plated emitting yarn is co-knit with at least one parent yarn for enhanced uniformity of an electrical current applied to at least one conductive electrode from the weft co-knit fabric, and a plurality of conductive electrodes arranged in an interdigitated layout to combine together each conductive electrode with a set of a plurality of conductive co-knit active emitting yarns which attach to each electrode tine of the conductive electrode in a select region.

18 Claims, 4 Drawing Sheets

(56) References Cited

U.S. PATENT DOCUMENTS

| | | | | |
|---|---|---|---|---|
| 9,955,532 B2 * | 4/2018 | Matsumoto | ............ | H05B 3/345 |
| 10,470,252 B2 * | 11/2019 | Lindskog | .............. | B32B 37/025 |
| 10,589,438 B2 * | 3/2020 | Nagata | .................. | H05B 3/345 |
| 2021/0388543 A1 * | 12/2021 | Hagihara | .............. | A61B 5/6804 |
| 2023/0136447 A1 * | 5/2023 | Riaz | ......................... | D04B 1/16 |
| | | | | 66/171 |
| 2024/0008815 A1 * | 1/2024 | Riaz | .................... | A61B 5/6804 |

* cited by examiner

WEFT KNIT INTERDIGITATED ELECTRODES FOR AUTOMOTIVE INTERIOR HEATING ELEMENTS

TECHNICAL FIELD

The technical field generally relates to the field of vehicles and, more specifically, an interdigitated knit electrode configuration for occupant seats of vehicles.

Many vehicles include occupant seats having heating elements. With certain types of vehicles, it may be desirable to provide different heat selective shapes and areas using a weft co-knit fabric in the occupant seats.

Accordingly, it is desirable to provide interior heating systems for automotive vehicles that contain various conductor electrode layouts having a different shaped electrode that enables uniform current and voltage applications using a combination of specialty weft co-knit infrared (IR) or electrically resistive yarn. or plated conductor yarns for homogenous heat dissipation across select regions of occupant seats. Furthermore, other desirable features and characteristics of the present invention will become apparent from the subsequent detailed description and the appended claims, taken in conjunction with the accompanying drawings.

SUMMARY

In one exemplary embodiment, an interior heating system using a weft co-knit fabric combined with at least one conductive electrode pair to heat selective regions of a vehicle seat is provided. The interior heating system includes the weft co-knit fabric including a set of knit weft active yarn configured with at least one conductive electrode pair wherein a knit weft active yarn includes a set of active yarn of at least one of a co-knit, tucked, or floated active yarn combined with at least one parent yarn for enhanced uniformity of an electrical current in a parallel configured resistive layout applied to the at least one conductive electrode pair across the selective regions; and a plurality of conductive electrodes arranged in an interdigitated layout in the selective regions to combine together each conductive electrode with a set of a plurality of conductive co-knit active yarn which is configured across an electrode tine of each conductive electrode coupled to a bus bar wherein the bus bar conducts electric current to a set of multiple electrode tines in the selective regions.

In various exemplary embodiments, the interior heating system further includes the selective regions configured in alternating course loops of the set of the plurality of conductive co-knit, tucked, or floated active yarn and a set of inert yarn for isolating each course loop or a set of course loops of a co-knit active yarn from an inert yarn. The interior heating system further includes a set of plated weft knit active yarn configured with the at least one conductive electrode pair wherein a plated weft knit active yarn is co-knit with at least one parent yarn for enhanced uniformity of the electrical current applied to the at least one conductive electrode pair. Each electrode tine is composed of a conductive metal or polymer material wherein the conductive metal is composed of at least one of a set of material of copper, nickel, brass, bronze, stainless steel or other selected highly conductive yarn material; and the set of multiple electrode tines are configured with a width in a range between two to fourteen wales or needles in horizontal wide. The set of multiple electrode tines is further configured in a preferable horizontal width in the range between six to eight wales. A distance between an end of each electrode tine and an opposing electrode bus bar is greater than the distance between an opposing set of electrode tines. The weft active yarn configured in a manner to not be co-knit between the end of each electrode tine and an opposing electrode bus bar. A number of either wales or needles of each set of electrode tines are constant throughout a length of the heating system. A heating region is configured to either extend or not to an edge of the weft co-knit fabric. The heating region is configured in a rectilinear shape or a convex shape. The multiple heating regions are configured in different geometric-shaped regions across the vehicle seat including one or more convex shapes of the weft co-knit fabric. The number of either wales or needles of each set of electrode tines or spacing between each electrical tine is configured in a manner that is not constant throughout a length of the heating system.

In another exemplary embodiment, an interior heating system for a vehicle is provided. The interior heating system includes an occupant seat; a weft co-knit fabric region; at least one conductive electrode wherein the weft co-knit fabric region is combined with at least one conductive electrode to heat selective regions of the occupant seat; a set of weft knit active yarn configured with at least one conductive electrode pair wherein the weft knit active yarn includes at least one of co-knit, tucked and floated active yarn with at least one parent yarn for enhanced uniformity of an electrical current in a parallel resistive layout applied to at least one conductive electrode across the selective regions; and a plurality of conductive electrodes arranged in an interdigitated layout in selective regions, each conductive electrode combined with a set of a plurality of conductive co-knit active yarn which originates from an electrode tine of each conductive electrode to a bus bar wherein the bus bar connects a set of multiple electrode tines across the weft co-knit fabric in selective regions.

In various exemplary embodiments, the interior heating system further includes the selective regions configured in alternating course loops of the set of the plurality of conductive co-knit, tucked or floated active yarn and a set of inert yarns for isolating each course loop or a set of course loops of a co-knit active yarn from an inert yarn. The interior heating system further includes a set of plated weft knit active yarn configured with the at least one conductive electrode pair wherein the plated weft knit is co-knit with at least one parent yarn for enhanced uniformity of the electrical current applied to at least one conductive electrode to dissipate even heat across the weft co-knit fabric in the selective regions. The set of multiple electrode tines are configured with a width in a range between two to fourteen wales or needles of horizontal wide; and each electrode tine is composed of a conductive metal or polymer material wherein the conductive metal is composed of at least one of a set of material including copper, nickel, brass, bronze, stainless steel or conductive yarn type material. The set of multiple electrode tines is further configured in a preferable horizontal width in the range between six to eight wales. A distance between an end of each electrode tine and an opposing electrode bus bar is greater than the distance between an opposing set of electrode tines. The weft co-knit active yarn is configured in a manner to be not knit in between an end of each electrode tine and an opposing electrode bus bar. A number of either wales or needles of each set of electrode tines are configured in a manner to be constant throughout the length of the heating system and spacing between electrical tines is configured in a manner to be not constant throughout the length of the heating system.

A heating region is configured in a manner to either extend or not to extend to an edge of the weft co-knit fabric. The heating region is configured in a plurality of geometric shapes associated with one or more of a set of heating regions across an occupant seat wherein each heating region includes one or more of a set of convex shapes including weft co-knit fabric.

In yet another exemplary embodiment, a vehicle is provided. The vehicle includes an interior heating system disposed within a vehicle body, the interior heating system including an automotive interior surface; a weft co-knit fabric; at least one conductive electrode, the weft co-knit fabric combined with at least one conductive electrode to a heat selective region of an occupant seat; a set of weft knit or plated weft knit active yarn configured with at least one conductive electrode wherein the weft knit active yarn includes co-knit, tucked and floated active yarn combined with at least one parent yarn for enhanced uniformity of an electrical current applied to at least one conductive electrode across the select region of the occupant seat; and a plurality of conductive electrodes arranged in an interdigitated layout in the select region of the occupant seat, each conductive electrode combined with a set of a plurality of conductive co-knit, tucked or floated active yarn configured with one or more electrode tines of each conductive electrode coupled to a bus bar wherein the bus bar connects a set of one or more electrode tines across the select region in the occupant seat, wherein the select region is configured in alternating course loops of a set of co-knit active yarn and a set of inert yarn for isolating each course loop of a co-knit active yarn from an inert yarn.

DESCRIPTION OF THE DRAWINGS

The present disclosure will hereinafter be described in conjunction with the following drawing figures, wherein like numerals denote like elements, and wherein.

DETAILED DESCRIPTION

Figure 1:
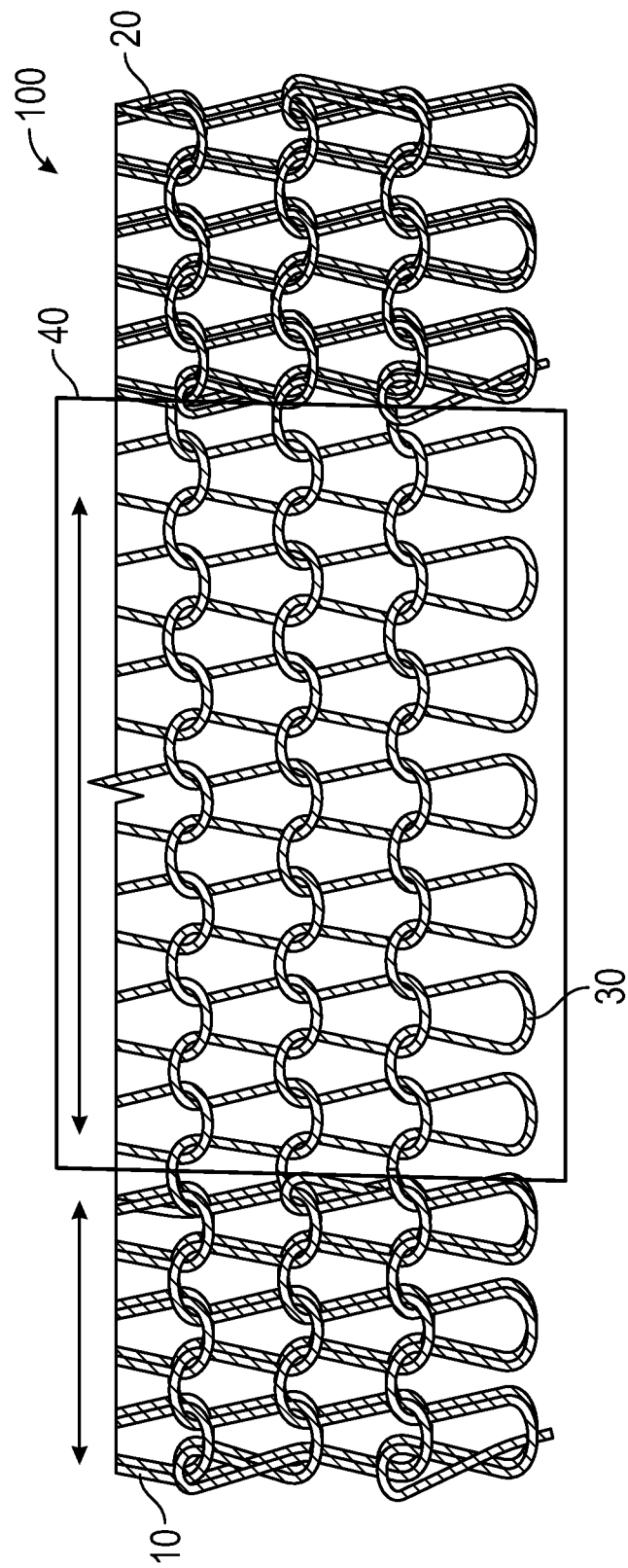
FIG. 1 is a schematic diagram of a weft knit heater structure repeat unit for use in the occupant seat of the vehicle, in accordance with exemplary embodiments.

The following detailed description is merely exemplary in nature and is not intended to limit the disclosure or the application and uses thereof. Furthermore, there is no intention to be bound by any theory presented in the preceding background or the following detailed description.

In a weft co-knit fabric structure, a horizontal row of loops is made using one thread and the thread runs in the horizontal direction. In the case of the weft co-knit IR-emitting (infrared) yarn combined with fabric, there can be interstitch between knit courses/rows that cause poor electrical conductivity in a primary current pathway along the length of the fabric or horizontal direction of the yarn. To ensure short and uniform resistive pathways along a course or rows that are needed for uniform heating, a co-knit process is implemented for combining interdigitated conductor electrodes that are located at the edges and arranged in selective heat shapes with fabric regions for even heat to emanate.

A resultant mutual perpendicular layout of the co-knit IR or plated (temperature emitting) yarn combined with the conductor electrode provides for uniform electrical topology control while maintaining weft knit capability. The combination of yarn conductive materials enables robust automotive heating that includes both resistive IR-emitting yarn and stainless-steel electrode yarn.

While an exemplary embodiment is described in the disclosure as implemented with co-knit IR yarn or plated temperature emitting yarn combined with the conductor electrode. It is contemplated that that other electrically resistive yarns may be used. That is, the IR yarn is one possible type of electrically resistive yarn that may be replaced as desired or required with other yarns that possess similar or different electrically resistive properties. Additionally, an exemplary embodiment is described in the disclosure as using yarn that is THERMOSIV® infrared (IR) yarn that may be co-knit, tucked, floated or plated with a parent yarn, this a chosen type of yarn variant that can or may benefit from the depicted electrode geometry. Additional implementations that are contemplated of various electrode geometries may also or may not benefit from the use of the THERMOSIV® IR yarn, and other types or variants of yarn possessing similar or different properties may be selected that can derive equal or better benefits from the electrode geometry. In other words, the embodiments depicted are limited to the types of yarn variants described but can or may include other available yarns possessing electrically resistive qualities.

The present disclosure describes systems, where the conductor electrodes are not located at the edge portion of the knit fabric and allowing for multiple tined, interdigitated set of conductor electrodes to be combined within either a select or several regions of the overall co-knit fabric. The conductor electrodes areas, therefore, are not required to be configured in uniform width (i.e. a variable number of needles and wales can be used). The needle count (i.e. number of wales) needs to be constant between all the conductor electrode portions to maintain a uniform parallel resistance for each of the regions or patches. This uniform resistance allows for the different shapes of the heating zone of shapes other than rectilinear (i.e. convex shapes).

The present disclosure describes systems for improving contact heating uniformity and electrical topology and resistance across an IR yarn in a weft co-knit. The advantage presented (i.e. co-knit, tucked, floated or plated IR emitting yarn) is that large co-knitted convex two-dimensional areas may be heated over short physical yarn lengths in a parallel resistor network because of the interdigitated design created by the co-knit conductor electrodes. This topology can be constructed in a weft co-knit fabric and a co-knit, that results in achieving a much greater co-knit aesthetic and more heater region shapes to be used in the occupant seats of vehicles.

FIG. 1 illustrates an electric heating element 100 formed of a co-knit fabric and includes current supply wires and resistance wires which are incorporated in the electric heating element 100. The different types of wires extend mutually perpendicularly in the heating element. The conductive wires 10, 20 may be disposed of in local or edge regions spaced apart with the co-knit weft fabric 40 located in the middle region. The co-knit weft fabric 40 is located between the conductive wires 10, 20 and is formed of nonconductive fibers or resistance wires 30. In an exemplary embodiment, the co-knit weft fabric 40 is composed of the weft knit IR emitting yarn co-knit to at least one positive and ground conductive electrode to dissipate homogenous heat from the weft co-knit fabric across the selective regions. The co-knit weft fabric 40 is part of the interior heating system for the vehicle and includes interdigitated knit electrodes (not shown in FIG. 1) (that are located at non-fabric-edge adjacent) developed to heat selective shapes and areas within the co-knit weft fabric 40. The mutual perpendicularity of the IR yarn contained in the co-knit weft fabric 40 from the electrode yarn allows electrical topology control while maintaining weft knit capability.

As depicted in FIG. 1, in various embodiments, for selective heating regions within a co-knit weft fabric 40, a combination of yarn materials and weft knit technique have been embodied that gives flexibility to the size and shape of the heater while maintaining a uniform parallel resistor network needed for constant voltage operation in an automotive interior. This exemplary embodiment depicted uses yarn of THERMOSIV® IR yarn that is co-knit or "plated" with a parent yarn (such as polyester) into the technical back face or a single fabric of a double knit via a weft knitting process. When an IR emitting yarn is subjected to a modest voltage, current passes through the yarn cause sufficient IR emission that produces heat (i.e. resistive heat dissipation). The resistive heat dissipation for a voltage source is given by $V^2/R$, where V is the applied voltage and R is the resistance of the IR emitting yarn. The same or similar heating behavior can or maybe observed from other electrically resistive yarns such as filamented, un-clad stainless steel yarn, etc.

As depicted in FIG. 1, in certain embodiments, to establish an interdigitated electrode, stainless steel yarn from BEKAERT® was selectively co-knit or plated with the IR emitting yarn over a small number of needles/wales (conductor 10, 20). Other low electrical resistance yarns, such as those that contain copper, silver, highly conductive carbon forms such as carbon nanotubes or graphene or are clad with copper may substitute for the stainless steel yarn used in the embodiment. Each electrode tine is co-knit or plated for a length of >2 wales/needles but preferably <14 wales/needles of contact before stopping for the next row/course. Shorter lengths of electrode contact with the IR yarn permit narrower electrode tines with lower electrode resistance. But longer electrode contact lengths along a row/course allow the improved electrical transmission to the IR yarn from the stainless steel (SS) electrode. It is found that 6-8 wales/needles of contact provide a good balance of narrow electrode tine width and good current transmission to the IR yarn.

The interdigitation of the electrodes allows for a constant voltage drop over a large surface area. Each tine of the interdigitated electrodes requires a separate yarn carrier in the knitting machine. For electrode tine of ~0.5 inches wide, an IR co-knit heating zone of ~2.0 inch (/12 volts) and an overall heater width of 24 inches requires >6 yarn carriers on the knitting machine. For other heating yarns with different electrical resistivities, the distance between electrode tines may be different to achieve the nominal automotive 12-volt potential difference. For each additional electrode pair, an additional pair (2) yarn carriers are required for each tine. A part of this co-knit technique is establishing intimate electrical contact between all of the individual electrode tines meet at the horizontal "bus bar" that distributes the current to each tine. The resulting close (i.e. intimate) contact between the horizontal "bus bar" and the individual tines is established with a co-knit technique that results from sufficient overlap, in courses and/or rows between the two portions that achieves better electrical continuity. When tine yarns are guided into or out of the fabric, a post-process (cutting) is needed to prevent electrical communication that can occur between adjacent tines. A Soldering and/or knot tying process (knit-based or manual) may also be used to secure the conductive loose ends.

Furthermore, the distance between adjacent tines (labeled "a" in FIG. 2, left) may need to be shorter than the distance from the end of an electrode tine and the "bus bar" such to prevent preferential heating at only the ends of the electrodes. This behavior is governed by the degree of contact resistance between courses (or rows) containing the IR yarn vs. along the length of the IR yarn. In the embodiment shown here, the number of vertical courses is 2× the number horizontal wales between electrode tines. An additional inlaid electrode yarn may be intermittently co-knit or tucked onto each electrode tine to reduce the parasitic resistance associated with the use of low conductive electrode yarns such as stainless steel.

Figure 2:
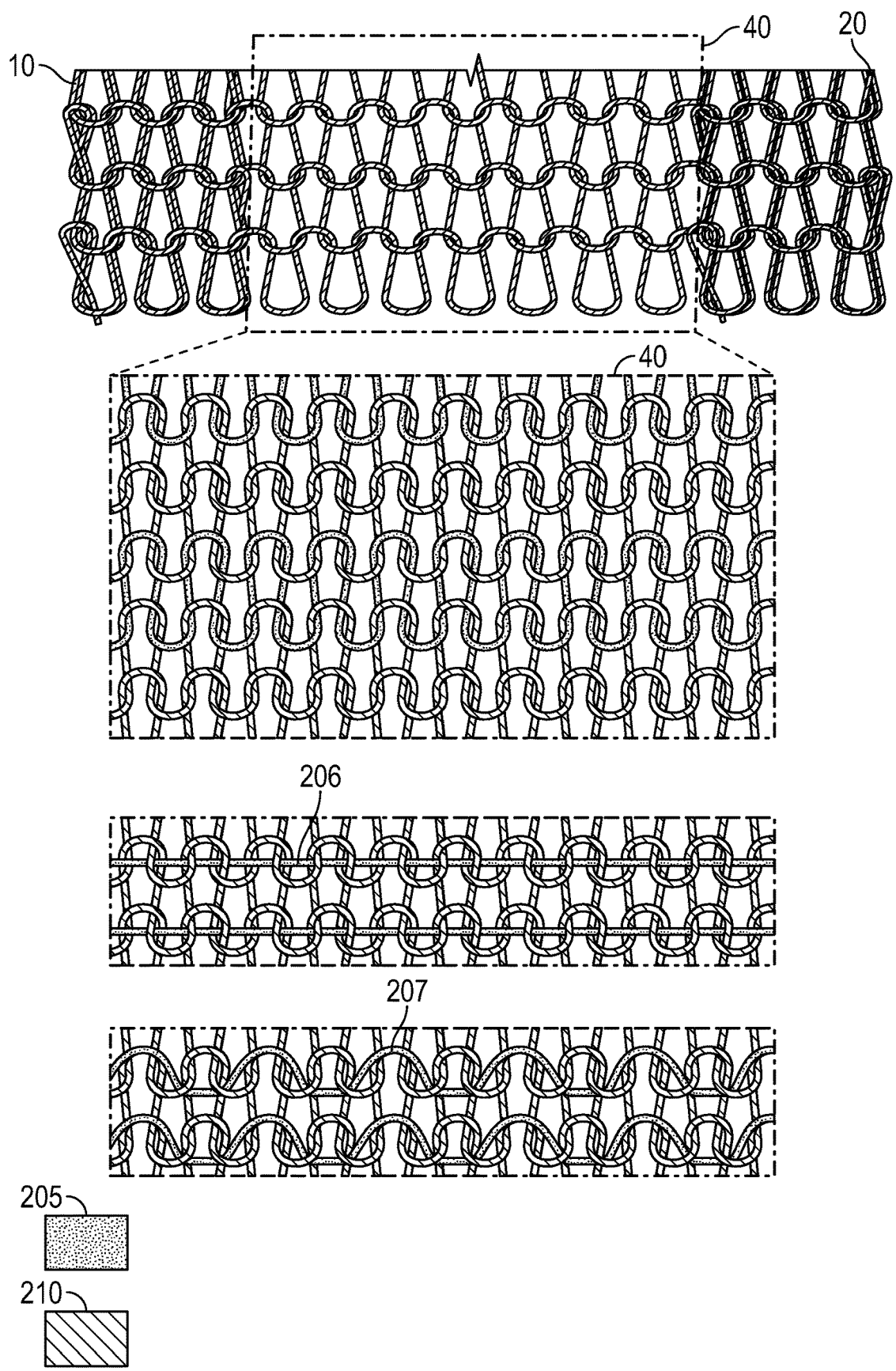
FIG. 2 is a schematic diagram of an alternate knitting scheme for the active yarn region of FIG. 1 of a weft knit heater structure repeat unit for use in the occupant seat of the vehicle, in accordance with exemplary embodiments.

FIG. 2 is a schematic diagram of an alternate knitting scheme for the active yarn region of FIG. 1 of a weft knit heater structure repeat unit for use in the occupant seat of the vehicle, in accordance with exemplary embodiments. In FIG. 2, the co-knit weft fabric 40 which is located between the conductive wires 10, 20 and is formed of nonconductive fibers or resistance wires 30 is configured with active yarns 205 and inert yarns 210 in the region of the co-knit weft fabric 40. That is the region or field between electrode tines that may be composed only of active yarn (as in FIG. 1) or may consist or be configured of alternating courses of active yarns 205 and inert yarns 210 in FIG. 2. By isolating individual loop courses or sets of courses which include active yarns 205 from similar adjacent courses by inert yarns 210 creates a more defined, predictable, controllable path for the electrical energy to traverse from one electrode tine to the opposing electrode tine. The structure to electrically isolate a single course of the active yarn may be knit 205, tuck 206 or float 207 or a combination thereof. This is because there is no electrical path configured in the wale direction, the length of active yarns 205 between tines can, therefore, be strictly (or at least better) defined. With this configuration, the functionality and the uniformity of electrically active yarns 205 are improved that results in associated electrical characteristics to be less dependent on in-plane tensions and enables a better traverse loading of the co-knit weft fabric 40 region.

Figure 3C:
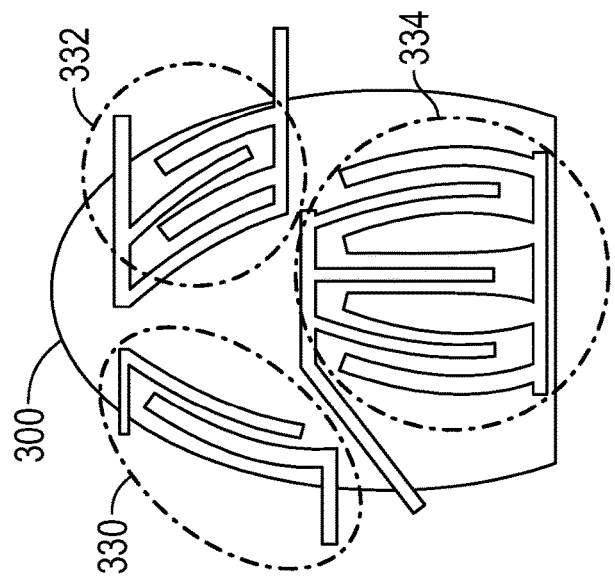
FIGS. 3A, 3B, and 3C provide perspective views of select heater regions with fabric and various layouts of heated regions for the weft knit heater structure repeat unit of the occupant seats of the vehicle of FIG. 1, in accordance with exemplary embodiments.
Figure 3B:
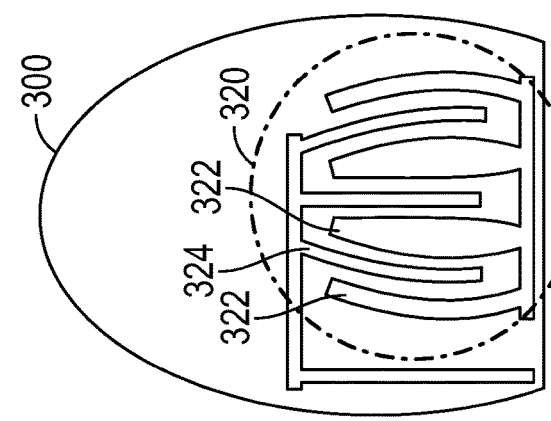
Figure 3A:
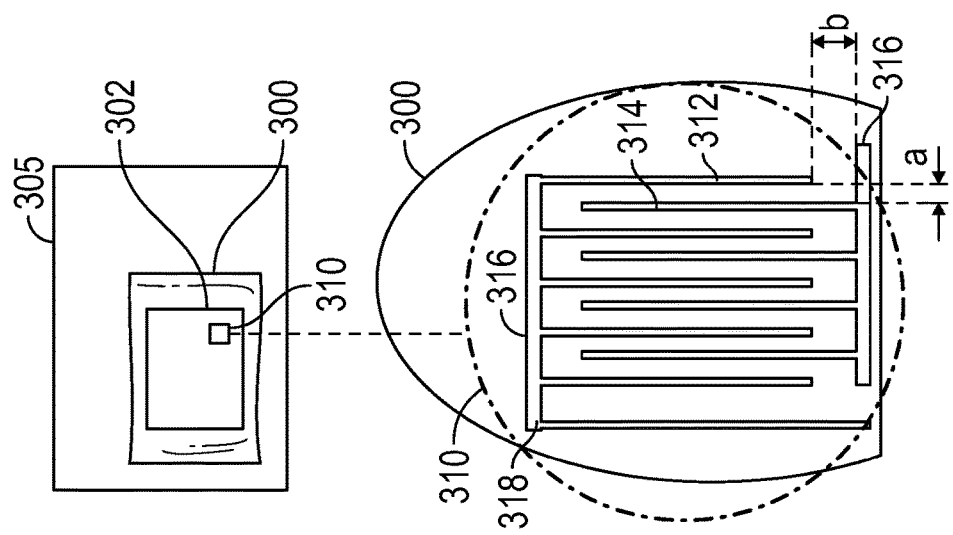

FIGS. 3A, 3B, and 3C provide a perspective view of the occupant seats 300 of the vehicle 305 with a heating system 302 contained in the occupant seats 300, in accordance with exemplary embodiments. As depicted in FIG. 3, in various embodiments, FIGS. 3A, 3B, and 3C illustrate select heater regions within a fabric. In FIG. 3A, a rectilinear layout 310 of conductor electrodes of occupant seat 300 is shown with tines 312, 314 with adjacent distance "a" between tines 314 and 312. A distance "b" is shown to a bus bar 316 that connects one set of tines 314. An opposing base bar 318 connects another set of tines 312. The length or distance of "a" between each tine is less than the distance "b" to the bus bar 316. In FIG. 3B a shaped heater region 320 uses contoured electrode tines 322, 324. The shaped heater region 320 enables a different shape or geometry of heat dissipation as the change in shape or geometry of the electrode tines 322, 324 is modified from a constant width electrode tine. Conversely, if the region or geometry of the weft co-knit fabric (not shown) that surrounds the electrode tines is of non-uniform width, the amount of electrical current, and consequently, the amount of heat output changes as a function of the inter-tine spacing. That is the electric heating of the weft fabric by the different shaped spacing between electrode tines 324, 322 causes different heating of the weft co-knit fabric for a given voltage and the heat output is changed. In FIG. 3C, the occupant seat 300 has multiple regions 330, 332, and 334 each composed of multiple sets of electrodes. Each multiple sets of electrodes have a different number of tines with a range of two or greater wales in horizontal width. The geometrical characteristics of the weft co-knit fabric change the heat dissipation in each of the regions 330, 332, and 334. Hence, multiple separate heated regions 330, 332, and 334 are possible of co-knit or plated weft knit IR emitting yarn with conductive electrodes. Each of the conductor electrode sets in each of the regions 330, 332 and 334 are arranged in an interdigitated manner that intimately connects all the conductive yarns from the electrode tines into a bus bar of each region. The electrode tines made of the same or different conductive metal or polymer: copper, nickel, brass, bronze, stainless steel or other highly conductive yarn materials in each region. For each region, the electrode tine width between 2 and 14 wales/needles wide. More preferably, 6-8 wales wide and the distance between electrode tine ends and the opposing electrode bus bar is greater than the distance between the opposing electrode tines. The number of wales or needles between electrode tines is constant throughout the entire heater regions of regions 330, 332 and 334. Also, each of the multiple heating regions, may or may not extend to the edges of the weft knit fabric. The multiple regions may each be a convex shape for manipulating the heat dissipation across the occupant seat 300 and the multiple heating regions may be arranged on the weft knit fabric (not shown). By manipulating the tine geometry and the heating region shape, the heating density of the surface area of the occupant seat may also be increased without having to increase the voltage applied to the weft co-knit fabric.

Figure 4B:
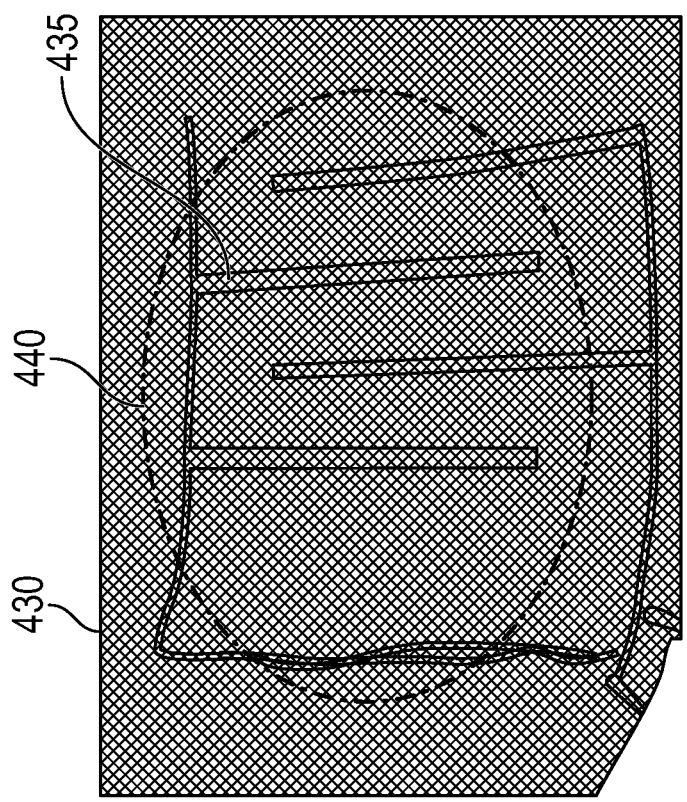
FIGS. 4A and 4B are views of the select regions of reduced parasitic voltage in tines of electrodes with additional intermittently co-knit conductive yarn for use in FIGS. 1-2, and FIGS. 3A, 3B and 3C, in accordance with exemplary embodiments.
Figure 4A:
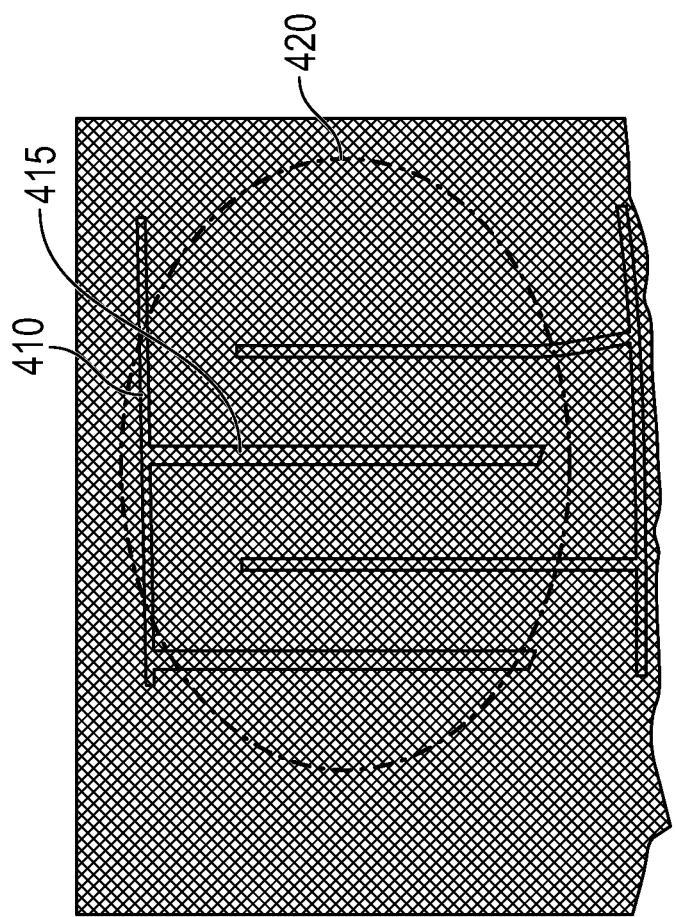

FIGS. 4A and 4B are views of the select regions of reduced parasitic voltage in tines of electrodes with additional intermittently co-knit conductive yarn for use in FIGS. 1-2, and FIGS. 3A, 3B and 3C, in accordance with exemplary embodiments. With reference to FIG. 4A, FIG. 4A illustrates a select region of weft co-knit fabric 410 and an applied voltage to a set of electrode tines 415 to cause heat to dissipate 420 from the weft co-knit fabric. FIG. 4B illustrates another select region of weft co-knit fabric 430 with a set of electrode tines 435 where a reduced parasitic voltage is applied to the set of electrode tines 435 that results in greater heat dissipation 440 because of the use of additional intermittently knit conductive yarn contained in the select region of the weft co-knit fabric 430.

Accordingly, the systems in vehicles described herein provide for a heating system of an occupant seat that includes weft co-knit fabric composed of weft co-knit active yarn or plated yarn which is co-knit with a parent yarn for more uniform or homogenous heat dissipation caused by the uniformity of applied current to a set of conductor electrode tines arranged in an interdigitated layout combined with the weft co-knit fabric.

It will be appreciated that the systems and vehicles may vary from those depicted in the Figures and described herein. It will similarly be appreciated that the heat seating systems, and components and implementations thereof, may be installed in any number of different types shapes (including those discussed above) in occupant seats, and vary from that depicted in FIGS. 1-2, 3A-3C, and 4A-4B and described in connection therewith, in various embodiments. The interior heating system can be in the seat, headliner, door panel or on the interstitial spaces and top surfaces of the instrument panel.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof

What is claimed is:

1. An interior heating system using a weft co-knit fabric combined with at least one conductive electrode pair to heat selective regions of a vehicle seat, the interior heating system comprising:
   the weft co-knit fabric comprising a set of knit weft active yarn configured with at least one conductive electrode pair wherein a knit weft active yarn comprises a set of active yarn of at least one of a co-knit, tucked, or floated active yarn combined with at least one parent yarn for enhanced uniformity of an electrical current in a parallel configured resistive layout applied to the at least one conductive electrode pair across the selective regions; and
   a plurality of conductive electrodes arranged in an interdigitated layout in the selective regions to combine together each conductive electrode with a set of a plurality of conductive co-knit active yarn which is configured across an electrode tine of each conductive electrode coupled to a bus bar wherein the bus bar conducts electric current to a set of multiple electrode tines in the selective regions;
   wherein the selective regions are configured in alternating course loops of the set of the plurality of conductive co-knit, tucked, or floated active yarn and a set of inert yarn for isolating each course loop or a set of course loops of a co-knit, tucked or floated active yarn from an inert yarn.

2. The interior heating system of claim 1, further comprising: a set of plated weft knit active yarn configured with the at least one conductive electrode pair wherein a plated weft knit active yarn is co-knit with at least one parent yarn for enhanced uniformity of the electrical current applied to the at least one conductive electrode pair.

3. The interior heating system of claim 2, wherein:
   each electrode tine is composed of a conductive metal or polymer material wherein the conductive metal is composed of at least one of a set of material of copper, nickel, brass, bronze, stainless steel or other selected highly conductive yarn material; and
   the set of multiple electrode tines are configured with a width in a range between two to fourteen wales or needles in horizontal width.

4. The interior heating system of claim 3, wherein:
the set of multiple electrode tines is further configured in a preferable horizontal width in the range between six to eight wales.

5. The interior heating system of claim 4,
wherein a distance between an end of each electrode tine and an opposing electrode bus bar is greater than the distance between an opposing set of electrode tines.

6. The interior heating system of claim 4,
wherein weft active yarn configured in a manner to not be co-knit between an end of each electrode tine and an opposing electrode bus bar.

7. The interior heating system of claim 6,
wherein a number of either wales or needles of each set of electrode tines is constant throughout a length of the interior heating system.

8. The interior heating system of claim 7,
wherein a heating region is configured to either extend or not to an edge of the weft co-knit fabric.

9. The interior heating system of claim 8,
wherein the heating region is configured in a rectilinear shape or a convex shape.

10. The interior heating system of claim 9,
wherein multiple heating regions are configured in different geometric-shaped regions across the vehicle seat comprising one or more convex shapes of the weft co-knit fabric.

11. The interior heating system of claim 10,
wherein the number of either wales or needles of each set of electrode tines or spacing between each electrical tine is configured in a manner that is not constant throughout a length of the interior heating system.

12. An interior heating system for a vehicle, the interior heating system comprising:
an occupant seat;
a weft co-knit fabric region;
at least one conductive electrode wherein the weft co-knit fabric region is combined with the at least one conductive electrode to heat selective regions of the occupant seat;
a set of weft knit active yarn configured with at least one conductive electrode pair wherein the weft knit active yarn comprise at least one of a set that comprises co-knit, tucked and floated active yarn combined with at least one parent yarn for enhanced uniformity of an electrical current in a parallel resistive layout applied to at least one conductive electrode across the selective regions; and
a plurality of conductive electrodes arranged in an interdigitated layout in selective regions, each conductive electrode combined with a set of a plurality of conductive active yarn comprising at least one of a set of co-knit, tucked, and floated active yarn which originates from an electrode tine of each conductive electrode to a bus bar wherein the bus bar connects a set of multiple electrode tines across the weft co-knit fabric in selective regions;
wherein the selective regions are configured in alternating course loops of the set of the plurality of conductive co-knit, tucked, or floated active yarn and a set of inert yarns for isolating each course loop or a set of course loops of a co-knit active yarn from an inert yarn.

13. The interior heating system of claim 12, further comprising:
a set of plated weft knit active yarn configured with the at least one conductive electrode pair wherein a plated weft knit is co-knit with at least one parent yarn for enhanced uniformity of the electrical current applied to the at least one conductive electrode to dissipate even heat across the weft co-knit fabric in the selective regions.

14. The interior heating system of claim 13, wherein:
the set of multiple electrode tines are configured with a width in a range between two to fourteen wales or needles of horizontal wide; and
each electrode tine is composed of a conductive metal or polymer material wherein the conductive metal is composed of at least one of a set of material comprising copper, nickel, brass, bronze, stainless steel or conductive yarn type material.

15. The interior heating system of claim 14, wherein:
the set of multiple electrode tines is further configured in a preferable horizontal width in the range between six to eight wales.

16. The interior heating system of claim 15,
wherein a distance between an end of each electrode tine and an opposing electrode bus bar is greater than the distance between an opposing set of electrode tines.

17. The interior heating system of claim 15,
wherein the weft co-knit active yarn is configured in a manner to be not knit in between an end of each electrode tine and an opposing electrode bus bar;
wherein a number of either wales or needles of each set of electrode tines is configured in a manner to be constant throughout a length of the interior heating system and a spacing between electrical tines is configured in a manner to be not constant throughout the length of the interior heating system;
wherein a heating region is configured in a manner to either extend or not to extend to an edge of the weft co-knit fabric; and
wherein the heating region is configured in a plurality of geometric shapes associated with one or more of a set of heating regions across an occupant seat wherein each heating region comprises one or more of a set of convex shapes comprising weft co-knit fabric.

18. A vehicle comprising:
an interior heating system disposed within a vehicle body, the interior heating system comprising:
an automotive interior surface;
a weft co-knit fabric;
at least one conductive electrode, the weft co-knit fabric combined with the at least one conductive electrode to a heat selective region of an occupant seat;
a set of weft knit or plated weft knit active yarn configured with the at least one conductive electrode wherein the weft knit active yarn is at least one of a set of active yarn comprising co-knit, tucked and floated active yarn with at least one parent yarn for enhanced uniformity of an electrical current applied to the at least one conductive electrode across a select region of the occupant seat; and
a plurality of conductive electrodes arranged in an interdigitated layout in the select region of the occupant seat, each conductive electrode combined with a set of a plurality of conductive co-knit active yarn configured with one or more electrode tines of each conductive electrode coupled to a bus bar wherein the bus bar connects a set of one or more electrode tines across the select region in the occupant seat, wherein the select region is configured in alternating course loops of a set of co-knit, tucked, or floated active yarn and a set of inert yarn for isolating each course loop of a co-knit active yarn from an inert yarn;

wherein the selective regions are configured in alternating course loops of the set of the plurality of conductive co-knit, tucked, or floated active yarn and a set of inert yarns for isolating each course loop or a set of course loops of the co-knit active yarn from the inert yarn.

\* \* \* \* \*